US006865449B2

(12) United States Patent
Dudley

(10) Patent No.: US 6,865,449 B2
(45) Date of Patent: Mar. 8, 2005

(54) LOCATION ADJUSTED HVAC CONTROL

(75) Inventor: Kevin F. Dudley, Cazenovia, NY (US)

(73) Assignee: Carrier Corporation, Farmington, CT (US)

( * ) Notice: Subject to any disclaimer, the term of this patent is extended or adjusted under 35 U.S.C. 154(b) by 183 days.

(21) Appl. No.: 10/147,400

(22) Filed: May 17, 2002

(65) Prior Publication Data

US 2003/0216838 A1 Nov. 20, 2003

(51) Int. Cl.[7] .................... G05B 13/00; G05D 23/00
(52) U.S. Cl. ................ 700/276; 700/277; 165/205; 165/209; 236/51
(58) Field of Search ............... 236/1, 51; 700/275–278; 165/205, 209

(56) References Cited

U.S. PATENT DOCUMENTS

| 5,156,203 | A | | 10/1992 | Funakoshi et al. |
| 5,170,935 | A | | 12/1992 | Federspiel et al. |
| 5,615,134 | A | | 3/1997 | Newsham et al. |
| 5,682,949 | A | * | 11/1997 | Ratcliffe et al. ............. 165/209 |
| 5,762,265 | A | | 6/1998 | Kitamura et al. |
| 5,927,398 | A | * | 7/1999 | Maciulewicz ............... 165/209 |
| 5,971,597 | A | | 10/1999 | Baldwin et al. |
| 6,098,893 | A | * | 8/2000 | Berglund et al. ............. 236/51 |
| 6,145,751 | A | | 11/2000 | Ahmed |
| 6,241,156 | B1 | | 6/2001 | Kline et al. |
| 6,366,832 | B2 | | 4/2002 | Lomonaco et al. |

* cited by examiner

Primary Examiner—Jayprakash N. Gandhi

(57) ABSTRACT

A system and method allows occupants in various locations to provide indications as to their respective levels of comfort. The indications as to comfort level are provided to a network computer. The network computer is operative to compute overall levels of comfort for each location by using a weighting factor for that location in combination with the indications as to levels of comfort These overall levels of comfort are sent to an HVAC control for further analysis prior to controlling the HVAC system that is to provide conditioned air to the locations. The resulting control of the HVAC system is influenced by the over weighting or under weighting factors used in computing the comfort levels for the locations.

18 Claims, 5 Drawing Sheets

1

LOCATION ADJUSTED HVAC CONTROL

BACKGROUND OF THE INVENTION

This invention relates to the control of an HVAC system using information gathered from locations to be provided with conditioned air from the HVAC system.

The control of an HVAC system has heretofore depended on gathering information such as sensed temperature from the locations in which conditioned air is to be provided by the system. The temperatures are usually sensed by temperature sensors in these locations. The sensed temperatures are usually compared with arbitrarily defined set point temperatures for the locations. The difference in these temperatures is used to define the demand for heating or cooling at each location. These location specific demands are used to control one or more HVAC systems providing conditioned air to the locations.

The above control may not completely reflect the appropriate levels of demand for heating or cooling at one or more of the locations. In this regard, some locations may have certain unique demands for heating or cooling that are not necessarily reflected in simply a temperature difference. For instance, a location might have a certain exposure to solar heating or cooling, or it might be an interior versus an exterior office area, or it may simply have certain occupants that are to be accorded a higher priority than the occupants in other locations.

It would be helpful to include information that may be used to differentiate demands for heating or cooling by other than expressed levels of comfort provided by the location.

SUMMARY OF THE INVENTION

A computer receives information as to comfort level from various locations that are to receive conditioned air. The level of comfort for each location is preferably first computed based upon the received information. These levels of comfort are thereafter preferably adjusted by weighting factors for each location. The adjusted levels of comfort for each location are sent to at least one HVAC control for further analysis prior to controlling an HVAC system that is to provide conditioned air to the locations. The resulting control of the HVAC system is influenced by the over weighting or under weighting factors used in generating the comfort levels for the locations. This gives some locations a stronger or weaker vote on the control of the HVAC system that is providing conditioned air to all of the locations.

In a preferred embodiment, the information received by the computer includes individual selections of comfort entered into data entry devices at the various locations. Each data entry device is operative to store selected comfort levels and timely provide the stored results to the network computer.

The preferred embodiment deals with processing levels of comfort for temperature in a number of locations. The invention is, however, equally applicable to other measurements of comfort that may be analyzed and thereafter acted upon, including for instance, humidity or air flow.

BRIEF DESCRIPTION OF THE DRAWINGS

Further advantages of the present invention will be apparent from the following detailed description in conjunction with the accompanying drawings, wherein.

DESCRIPTION OF THE PREFERRED EMBODIMENT

Figure 1:
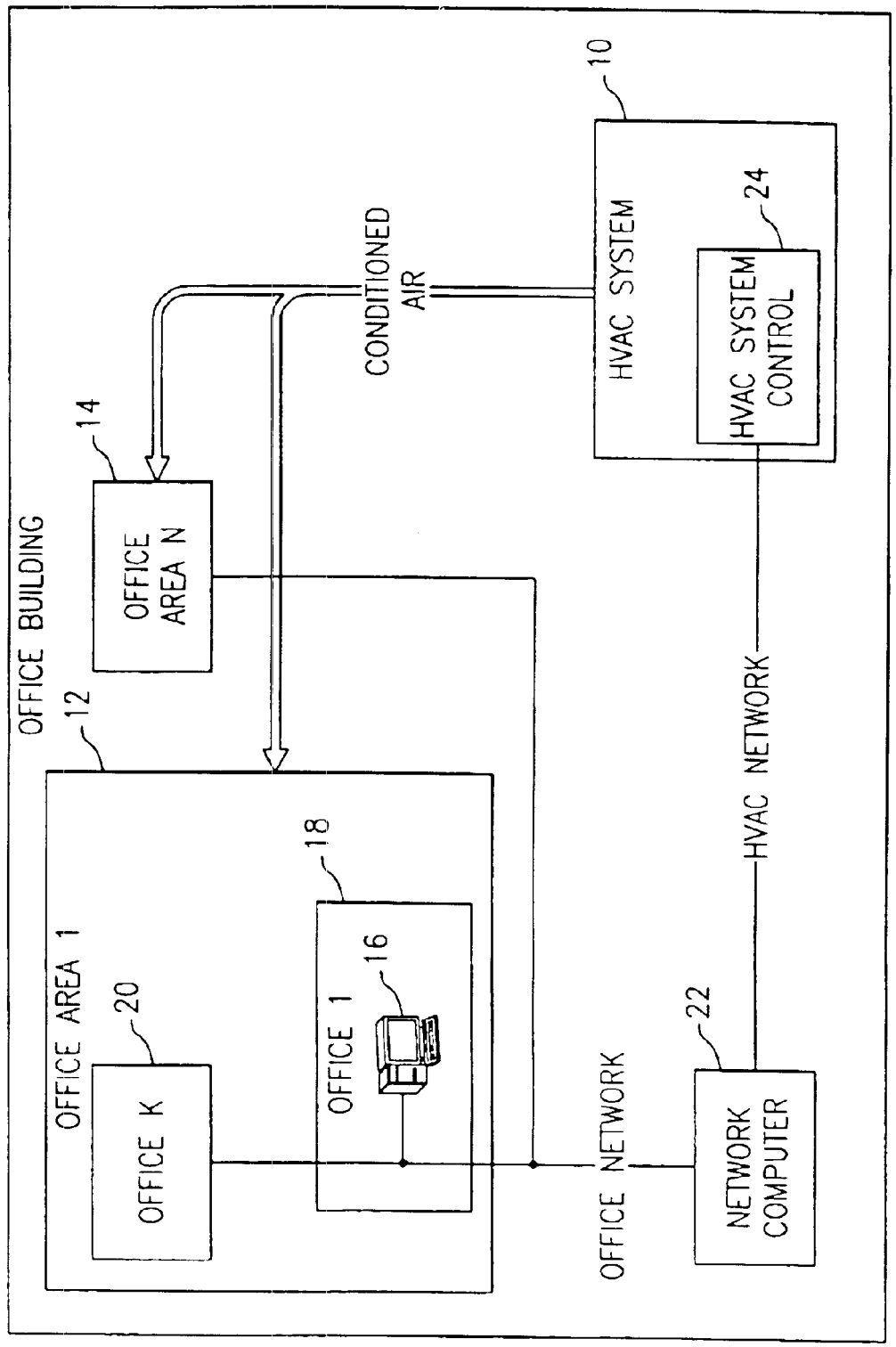
FIG. 1 illustrates an office building with a number of offices grouped into a number of office area locations.

Referring to FIG. 1, an HVAC system 10 provides conditioned air to a number of individual office area locations such as office area location 12 and office area location 14. Each office area location will carry a particular office area index value for purposes of identifying comfort level data originating from the particular office area location. This is indicated by office area location 12 being office area 1 whereas office area location 14 is identified as office area N.

Each office area location is seen to include a number of individual personal computers such as computer 16 located in an office 18. Each office within office area location 12 is identified by an office index "K" where K=for instance 1 for office 18 and is for instance another value for office 20.

Each computer within an office in a particular office area location is preferably connected to a network computer 22. As will be explained in detail hereinafter, the network computer 22 is operative to collect comfort level information entered in each of the computers within the individual offices of each office area location. The collected information is analyzed by particular office area index value. The network computer is thereafter operative to generate overall indications as to level of comfort in each office area. These overall indications as to comfort level are preferably indexed in accordance with the office area index and provided to an HVAC system control 24. The HVAC system control 24 is operative to control the HVAC system 10 so as to provide appropriate amounts of conditioned air to each of the office areas in accordance with the information received from the network computer 22.

Figure 2:
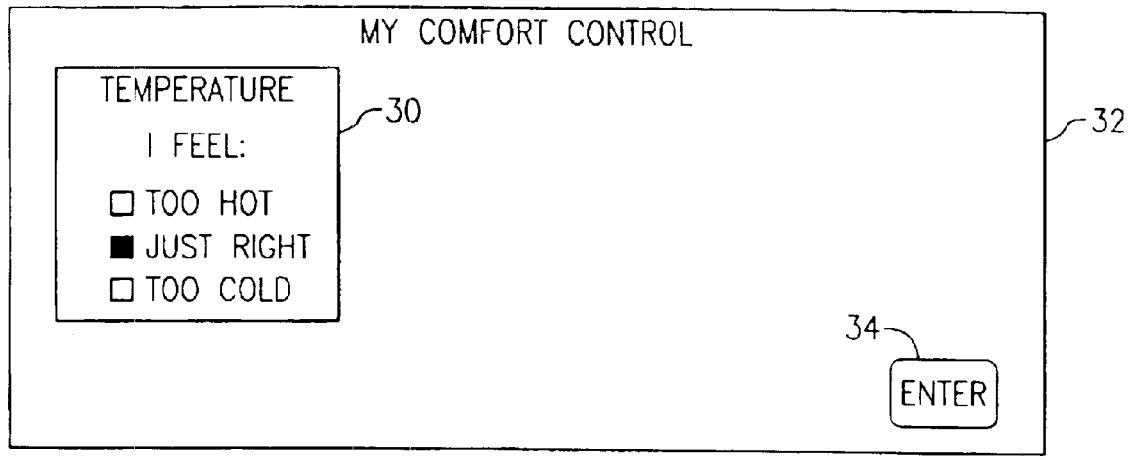
FIG. 2 illustrates a display menu as to comfort levels appearing on the screens of computers in the offices of FIG. 1.

Referring now to FIG. 2, a comfort level menu 30 appearing on the screen 32 of an office computer such as office computer 16 is shown. The comfort menu 30 preferably includes three levels of comfort for the temperature in the office in which the computer is located. These comfort levels are expressed as "TOO HOT", "JUST RIGHT", or "TOO COLD". The office computer preferably includes a point and click operating system which allows the user to click on the particular comfort level being experienced by the occupant of the office. The occupant of the office thereafter preferably clicks on an icon 34 labeled "ENTER" after making his or her selection as to comfort level from the menu 30.

Figure 3:
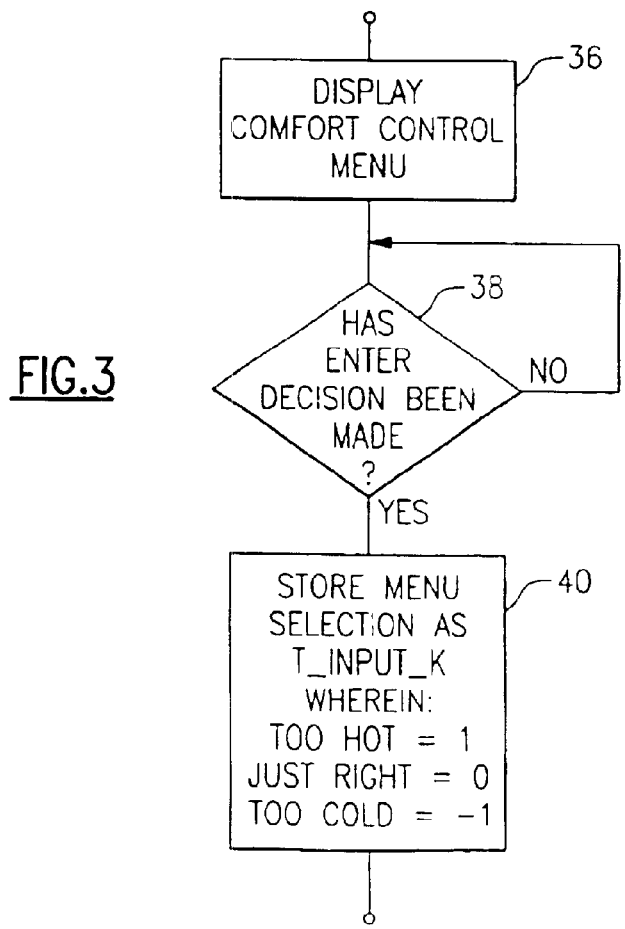
FIG. 3 illustrates a program located in the computers which generate the display menu of FIG. 2.

Referring now to FIG. 3, the software routine executed by a processor within an office computer is shown. The routine begins with a step 36 wherein a comfort control menu is displayed on the computer screen of the office computer. The comfort control menu could be the particular comfort control menu 30 of FIG. 2. The processor proceeds to a step 38 and inquires as to whether an "ENTER" decision has been made. An "ENTER" decision will have been made when the occupant clicks upon the "ENTER" icon 34 appearing on the computer screen 32 in FIG. 2. When an "ENTER" decision has been made, the processor proceeds from step 38 to step 40 and stores the menu selection made from the displayed menu of step 36. For a menu selection made from the menu 30, the processor preferably stores the selection as "T_INPUT_K". The value of "K" within the stored menu selection variable "T_INPUT_K" will be the office index value for the particular office in which the office computer is located. The stored menu selection in "T_INPUT_K" is preferably 1 for a comfort level selection of "TOO HOT", 0 for a comfort level selection of "JUST RIGHT", and −1 for a comfort selection of "TOO COLD".

Figure 4:
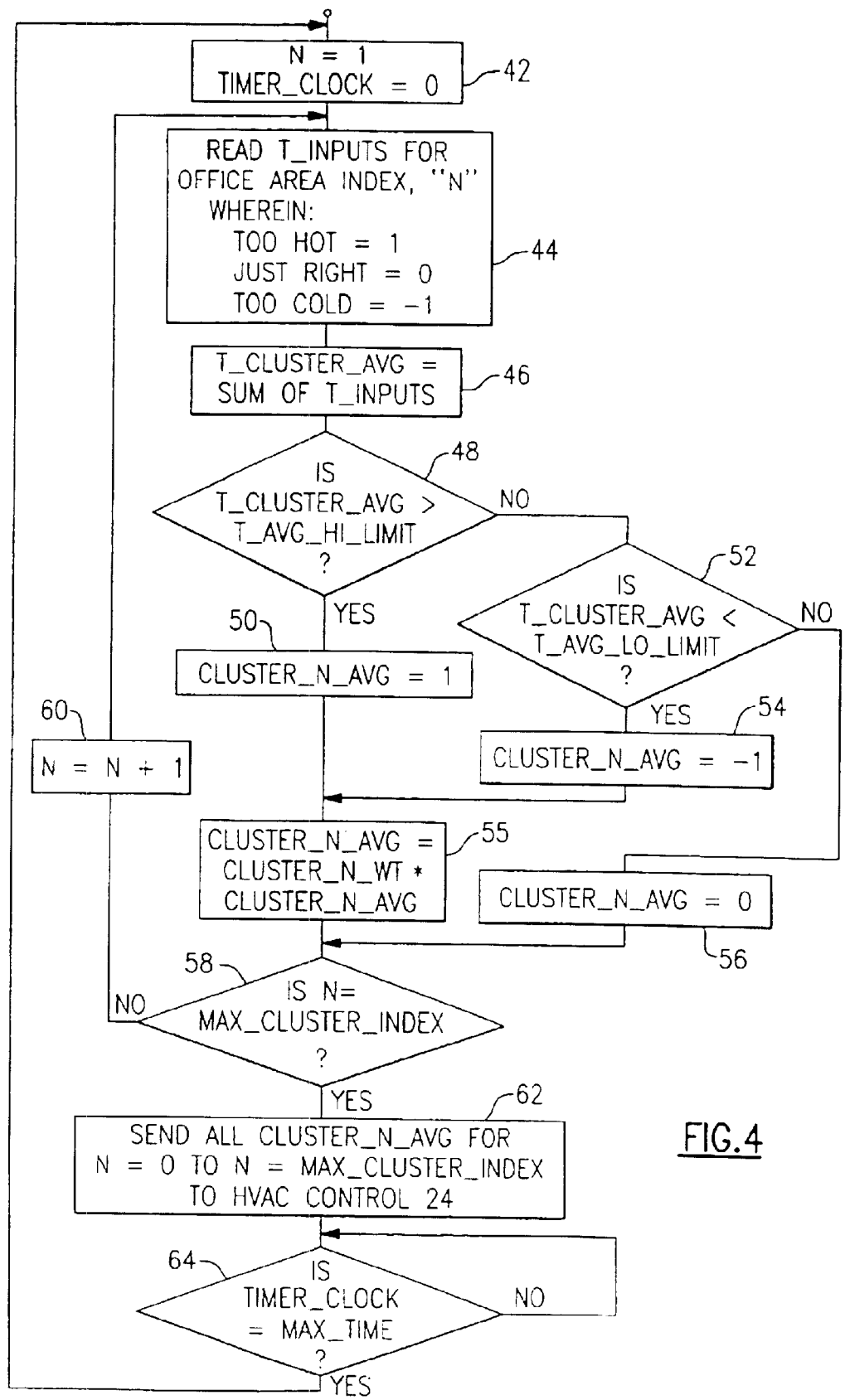
FIG. 4 illustrates a program located on a network computer which collects and analyzes the menu selections entered into the programmed computers in the offices of FIG. 1.

Referring now to FIG. 4, the computer program implemented by the processor within the network computer 22 is shown. The program begins with a step 42 wherein the office area index, "N" is set equal to 1. A "TIMER_CLOCK" is also set equal to 0 so as to thereafter begin clocking time from a system clock associated with the processor in the network computer. The processor proceeds to step 44 and reads "T_INPUTS" for the office area index, "N". Since "N" will be initially set equal to 1, the processor will be reading the menu selections for the office computers in office area 12. The processor will preferably read each stored menu selection, "T_INPUT_K" for the particular office computer in the office area 12. It will be remembered that the value of the stored menu selection will be 1 if the comfort level selection was "TOO HOT", 0 if the comfort level selection was "JUST RIGHT", and −1 if the comfort level selection was "TOO COLD". The processor will proceed to a step 46 and compute the value of a variable "T_CLUSTER_AVG". The value of this variable is equal to the sum of the read "T_INPUTS" in step 44. The processor will proceed to a step 48 and inquire as to whether the value of "T_CLUSTER_AVG" is greater than the value of a variable "T_AVG_HI_LIMIT". It is to be understood that the value of "T_AVG_HI_LIMIT" will be predefined for the particular office building or even office area under review. In this regard, assuming that there are ten office computers in each office area of the office building, then the value of "T_AVG_HI_LIMIT" could be equal to 5. This would require that the net sum of T_INPUTs would have to be greater than 5 in step 48 in order for the processor to proceed to a step 50. It is, of course, to be appreciated that the value of "T_AVG_HI_LIMIT" could be set lower so as to not require that so many stored menu selections be equal to 1. Referring to step 50, in the event that "T_CLUSTER_AVG" is greater than "T_AVG_HI_LIMIT", then the processor sets the variable "CLUSTER_N_AVG" equal to 1. The value of "N" in this variable will equal the current office area index value. This variable will therefore be an overall indication as to the comfort level in the office area indicated by the index value "N". This overall indication would be "TOO HOT" out of step 50.

Referring again to step 48, in the event that "T_CLUSTER_AVG" is not greater than "T_AVG_HI_LIMIT", then the processor will proceed along a no path to a step 52. Referring to step 52, the processor will inquire as to whether "T_CLUSTER_AVG" is less than the value of "T_AVG_LOW_LIMIT". It is to be appreciated that the value of "T_AVG_LOW_LIMIT" will be set for all office areas in the office building or for the particular office area then under review. This value will again be set so as to require that the net sum of "T INPUTS" is predominantly negative so as to indicate a predominance of "TOO COLD" having been selected from the menu 30 on each screen of an office computer within the office area indicated by the index "N". For instance, this variable may be set equal to −3, −4, or even −5 for an office area including ten separate office computers. In the event that "T_CLUSTER_AVG" is less than the value of "T_AVG_LO_LIMIT", then the processor will proceed from step 52 to a step 54 and set "CLUSTER_N_AVG" equal to −1. This will be an overall indication that the office area having an office area index equal to the current value of N is too cold.

The processor proceeds from either step 50 or step 54 to a step 55 and adjusts the previously computed "CLUSTER_N_AVG" by a weighting factor "CLUSTER_N_WT" for the particular office area "N". This weighting factor is preferably accessed from a table of weighting factors for each office area previously stored in memory within or associated with the network computer 22. The weighting factor is preferably previously computed using any number of relevant parameters that would differentiate the heating or cooling needs of the particular office area from the other office areas to be provided with conditioned air. These relevant parameters might for instance include the size of the particular office area versus the sizes of other office areas that are to be provided with conditioned air. The relevant parameters might also include the exposure of the particular office area to solar heating or cooling depending on the time of day. The relevant parameters might also include the particular construction of the office area versus the other office areas that might account for a need for less heating or cooling versus other office areas. The relevant parameters might also include simply noting whether the office area is an interior space without windows or an office space with a number of windows. The relevant parameters might also include relative priorities based on who is occupying particular locations. For example, the president's office or the corporate board room may have a higher priority to that of a mail room. Finally, it is to be noted that the weighting factor "CLUSTER_N_WT" could be computed in real time taking into account any number of the aforementioned parameters for the particular location that might vary from day to day or even hour to hour. It is finally to be noted that the weighting factor is preferably normalized relative to all other weighting factors so that it is either a fractional amount less than one or a fractional amount greater than one. The thus preferably normalized weighting factor, "CLUSTER_N_WT" is multiplied times the previously computed "CLUSTER_N_AVG" in step 57 so as to produce an adjusted CLUSTER_N_AVG. This "CLUSTER_N_AVG" will itself either be minus one or a fractional amount less than or a fractional amount greater than minus one for an adjusted CLUSTER_N_AVG originally computed in step 54. On the other hand, the "CLUSTER_N_AVG" will either be one or a fractional amount less than or a fractional amount greater than one for an adjusted CLUSTER_N_AVG originally computed in step 50.

Referring again to step 52, in the event that "T_CLUSTER AVG" is not less than "T_AVG_LO_LIMIT", then the processor will proceed to step 56 and set "CLUSTER_N_AVG" equal to 0, wherein the value of "N" will be the particular value of the office area index. This will be an overall indication that the temperature level is "JUST RIGHT" for the particular office area.

The processor proceeds from either steps 55 or 56 to step 58 and inquires as to whether the office area index "N" is equal to "MAX_CLUSTER_INDEX". The value of "MAX_CLUSTER_INDEX" will be equal to the highest value of the office area index identifying the last office area to be analyzed. In the event that the value of the office area index "N" is not equal to "MAX_CLUSTER_INDEX", then the processor will proceed to a step 60 and increment the office area index "N" by one before returning to step 44. It is to be understood that the processor within the network computer will again execute steps 44–58 so as to determine the overall indication of comfort for the office area indicated by the new value of office area index "N" This will be stored in the new "CLUSTER_N_AVG". The value of the office area index "N" in the variable "CLUSTER_N_AVG" will identify the particular office area to which the overall comfort level indication applies.

Referring again to step 58, it will be understood that at some point, all office areas will have been analyzed and all overall comfort level indications will have been defined in respective values of "CLUSTER_N_AVG". When this occurs, the processor will proceed to a step 62 and send all CLUSTER_N_AVGs for N=0 to N=MAX_CLUSTER to the HVAC system control 24. The processor will proceed to step 64 and inquire as to whether the value of "TIMER_ CLOCK" equals "MAX_TIME". The value of "MAX_ TIME" will be arbitrarily set for the particular office building or office area under examination. In either case, the "TIMER CLOCK" must exceed the "MAX TIME" in order for the processor to proceed back to step 42 and again begin to collect the comfort level selections that have been made and stored as "T_INPUT K" for each office computer in the first office area having an office area index value of 1. The menu sections from all such office computers will again be analyzed and an overall comfort level indication for each particular office area will be defined in CLUSTER_N_ AVG before proceeding to the next office area. When all such office areas have been analyzed, the overall comfort level indications for each office area will be forwarded to the HVAC control 24 again in step 62.

Figure 5:
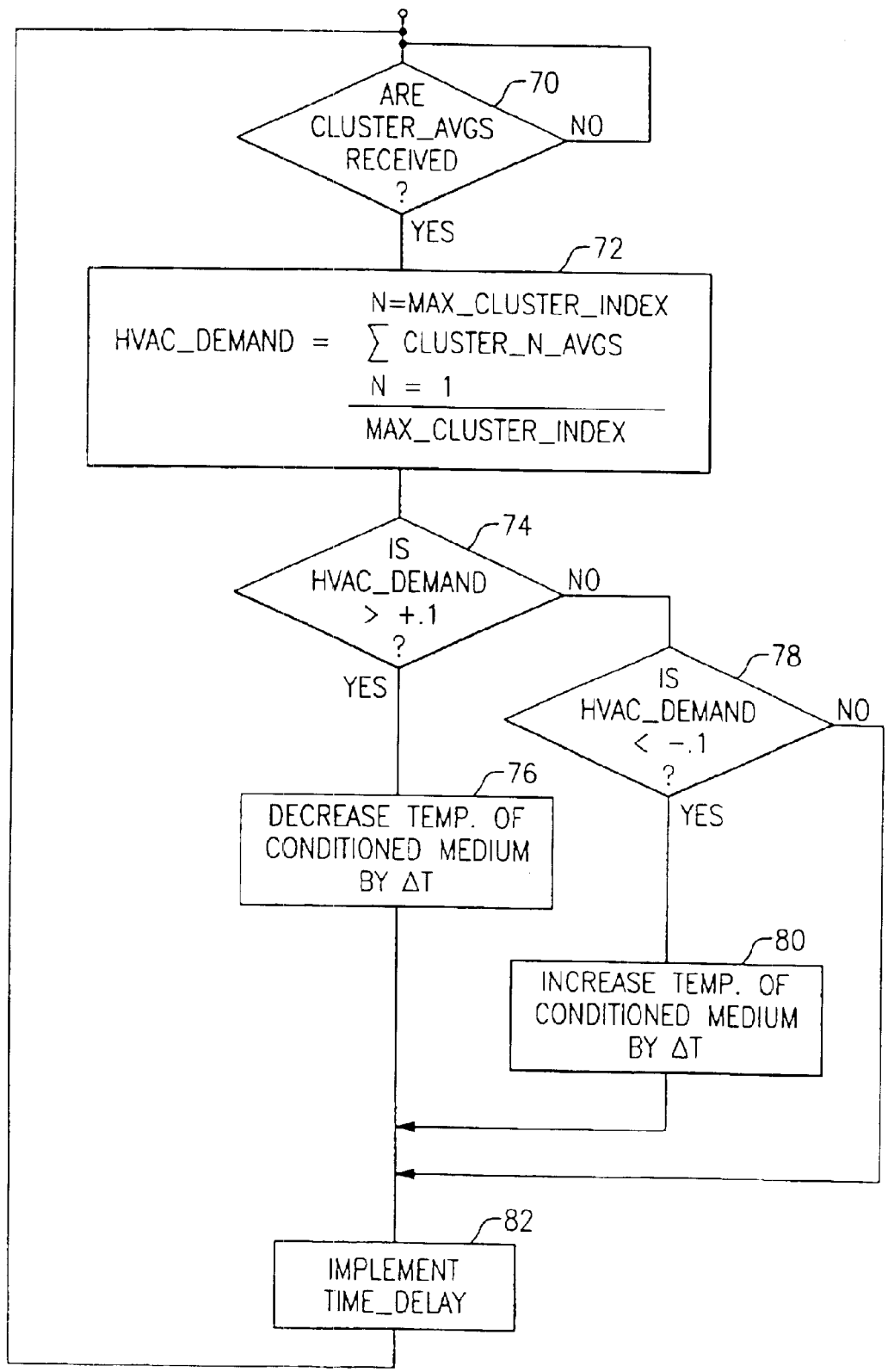
FIG. 5 illustrates an exemplary program that may be executed by a processor within an HVAC system control in response to one or more commands from the network computer executing the program of FIG. 4.

Referring now to FIG. 5, an exemplary program or process is set forth that could be implemented in the HVAC system control 24. The exemplary program could be used in response to the overall comfort level indications for each office area that are sent by the network computer 22. The program or process begins with a processor within the HVAC system control implementing a step 70 wherein inquiry is made as to whether all "CLUSTER_AVG" values have been received from the network computer 22. When this occurs, the processor proceeds to step 72 and computes an overall demand for the HVAC system that is identified as "HVAC_DEMAND". This overall demand is computed by summing the values for each of the "CLUSTER_N_AVGs" received in step 70 and dividing the thus summed values by the value of MAX_CLUSTER_INDEX. It will be remembered that each of the CLUSTER_N_AVGs were previously computed as weight adjusted and normalized values for each respective cluster of personal computers in a given office location "N". The resulting summation of these values should hence be a summation of values each of which is either zero, or some amount fractionally less, equal to, or fractionally greater than one or minus one. Since the value of "MAX _CLUSTER_INDEX" is equal to the total number of clusters, the resulting value of "HVAC DEMAND" should fall in the range of being fractionally less than minus one to fractionally more than plus one.

Referring to step 74, the resulting value of "HVAC_ DEMAND" is compared with a fractional value greater than zero. This fractional value is particularly set at one tenth, but could be set higher or lower depending on what threshold setting is desired for the particular HVAC system control. In the event that "HVAC_DEMAND" is greater than the stipulated fractional value, the processor proceeds to a step 76 and orders the HVAC system to decrease the temperature of a conditioned medium used to provide conditioned air to the locations by a prescribed $\Delta T$ amount. In this regard, if the HVAC system was a hydronic system providing conditioned water to each location, than the temperature of the water being provided would be reduced by the $\Delta T$ amount. Such systems typically include fan coil heat exchangers that circulate air over coils containing the circulated water. On the other hand, if the HVAC system were directly providing conditioned air then the amount of compressed refrigerant flowing through one or more evaporator coils would be increased to thereby lower the temperature of the conditioned air to be provided to each location by the $\Delta T$ amount. It is also to be appreciated that other cooling schemes could be implemented that might proportionally decrease the temperature of the medium conditioned by the HVAC system in response to the particular amount by which the "HVAC _DEMAND" exceeds the stipulated fractional amount in step 76.

Referring to step 78, the resulting value of "HVAC_ DEMAND" from step 72 is compared with a fractional value less than zero which is particularly set at minus one tenth. In the event that "HVAC_DEMAND" is less than the stipulated fractional value, the processor proceeds to a step 80 and orders the HVAC system to increase the temperature of a conditioned medium used to provide conditioned air to the locations by a prescribed $\Delta T$ amount. In this regard, if the HVAC system being controlled is a hydronic system providing conditioned water to each location, than the temperature of the water being provided would be increased by the $\Delta T$ amount. Such systems typically include fan coil heat exchangers that circulate air over coils containing the circulated water. On the other hand, if the HVAC system were a heat pump directly providing conditioned air than the amount of compressed refrigerant flowing through one or more condenser coils would be increased to thereby raise the temperature of the conditioned air to be provided to each location by the $\Delta T$ amount. If on the other hand, the HVAC system being controlled were a boiler, than the burner in the boiler would be activated for a period of time long enough to increase the temperature of the water being heated by the $\Delta T$ amount. It is also to be appreciated that other heating schemes could be implemented that might proportionally increase the temperature of the medium conditioned by the HVAC system in response to the particular amount by which the "HVAC_DEMAND" exceeds the stipulated fractional amount in step 78.

Referring now to step 82, the processor within the HVAC control will either have arrived at this step from step 76 or steps 78, or 80. The processor will implement a TIME_ DELAY of $\delta t$ before again returning to step 70 to inquire as to whether a new set of CLUSTER_AVGs" have been received from the network computer. In this regard, the network computer will preferably be programmed so as to compute a new set of "CLUSTER_AVGs" by the time that the time delay of $\delta t$ has expired so as to prompt the processor within the HVAC system control 24 to again implement the process of FIG. 5. The processor will again compute a new HVAC DEMAND and thereafter adjust the temperature of the conditioned medium as previously discussed.

Figure 6:
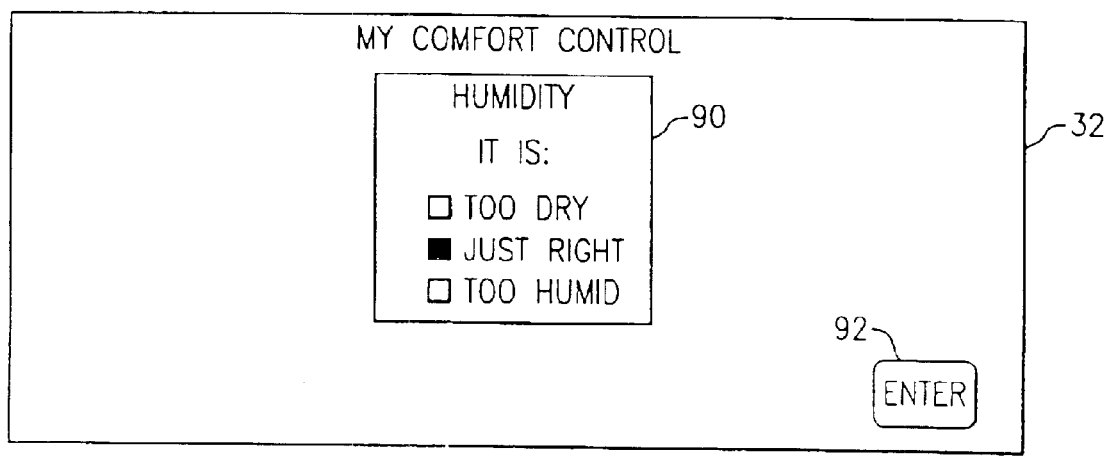
FIG. 6 illustrates the display of an alternative comfort level menu to that of FIG. 2.

Referring now to FIG. 6, an example of an alternative menu that could be displayed on each office computer is shown. The comfort control menu 90 is with respect to humidity. In this regard, the occupant of the room is invited to select between "TOO DRY", "JUST RIGHT" and "TOO HUMID". The occupant clicks on the ENTER icon 92 when the selection has been made. The network computer will analyze the comfort level values for each office computer regarding humidity in much the same manner as been heretofore described with respect to the comfort control for temperature in FIG. 2. The humidity for all office areas will either be adjusted upwardly or downwardly or no change will be made to it depending on the value of the HVAC_ DEMAND variable. If the overall humidity is to be raised, and one or more of the offices, in fact, indicated that they wanted less humidity, then the dampers to these office areas could be controlled so as to provide less flow of the more humid air to these locations.

It is to be appreciated from the above that a number of programs resident in processors within an office computer, a network computer, and an HVAC system control have been disclosed. Alterations, modifications and improvements to these various individual programs may readily occur to those skilled in the art. For instance, the particular comfort control menu may vary as to how it is displayed as well as how many particular comfort level selections may be made. Furthermore, the processor program executed by the network computer could compute the overall comfort level indications for each particular office area in a different manner. This could include summing all comfort level values provided by the office computers and dividing by the number of computers in the particular office area. This could thereafter be compared with an appropriate high and low limit for such a computed average before adjusting the particular overall comfort level indication for that particular office area. The adjustment factors used by the network computer program could furthermore be computed differently either in real time or prior to being used in the network computer. It is to be furthermore understood that the particular program implemented by an HVAC system control downstream of the network computer could vary considerably depending on the HVAC system that is to be controlled and the particular HVAC DEMAND that would be computed. Accordingly, the foregoing description of the particular programs in the preferred embodiment is by way of example only and the invention is to be limited by the following claims and equivalents thereto.

What is claimed is:

1. A process for controlling a system that provides conditioned air to a plurality of locations, said process comprising the steps of:
   collecting information as to levels of comfort from each location;
   computing a level of comfort for each location using the collected information as well as further information concerning the need for conditioned air at each location relative to the need for conditioned air at other locations; and
   transmitting indications as to the computed levels of comfort for each location to the system that provides conditioned air to the plurality of locations, wherein the system that provides conditioned air to the plurality of locations includes at least one HVAC control that is operative to control the provision of air to each of the locations and wherein said step of transmitting indications as to the computed levels of comfort for each location to the system that provides conditioned air to the plurality of locations comprises transmitting the indications as to the computed overall levels of comfort to the HVAC control that is operative to control the provision of air to each of the locations.

2. The process of claim 1 wherein said step of computing the level of comfort for each location comprises the step of: using stored adjustment factors which have been previously generated based upon the need for conditioned air at each location relative to the need for conditioned air at other locations.

3. The process of claim 2 wherein the adjustment factors are defined relative to a numerical value of one with factors fractionally greater than one for locations requiring more conditioned air and factors being less than one for locations requiring less conditioned air.

4. The process of claim 2 wherein said step of computing a level of comfort for each location further comprises the steps of:
   determining an overall level of comfort for each particular location based upon the collected information as to levels of comfort from these locations; and
   applying the stored adjustment factor for the particular location to the previously determined overall level of comfort for the particular location.

5. The process of claim 4 wherein the adjustment factors are defined relative to a numerical value of one with factors fractionally greater than one for locations requiring more conditioned air and factors being less than one for locations requiring less conditioned air.

6. The process of claim 2 wherein the stored adjustment factors have been previously generated based upon the heat retention properties or by occupancy priority for the locations.

7. The process of claim 1 further comprising the steps of:
   providing for the entry of one or more levels of comfort in a plurality of data entry devices at each location whereby said step of collecting information as to the levels of comfort comprises the step of collecting the one or more levels of comfort entered at the data entry devices at each location; and
   wherein said step of computing a level comfort for each location comprises determining an overall level of comfort for each particular location from the collected information as to the levels of comfort entered at the particular location and adjusting the determined overall level for the particular location using the further information concerning the need for conditioned air at each location relative to the need for conditioned air at other locations.

8. The process of claim 7 wherein the further information concerning the need for conditioned air at each location relative to the need for conditioned air at other locations comprises stored adjustment factors for each location, each adjustment factor having been previously generated based upon the need for conditioned air at a respective location relative to the need for conditioned air at the other locations and wherein said step of adjusting the determined overall level of comfort for the particular location comprises the step of:
   applying the stored adjustment factor for the location to the determined overall level of comfort for the particular location, the stored adjustment factor having been previously generated based upon the need for conditioned air at the particular location relative to the need for conditioned air at other locations.

9. The process of claim 8 wherein the stored adjustment factors have been previously generated based upon the heat retention properties or by occupancy priority for the location.

10. The process of claim 7 wherein said step of providing for the entry of one or more levels of comfort in a plurality of data entry devices comprises the steps of:
    generating a menu of different comfort levels that may be selected at each data entry device; and storing at least one comfort level that is selected in the data entry device.

11. A system for providing conditioned air to a plurality of locations, said system comprising:

at least one data entry device at each location, each data entry device being operative to provide for the selection of at least one level of comfort at the location;

at least one computer in communication with the plurality of data entry devices, said computer being operative to collect information as to the selections of comfort level entered at the data entry devices and being furthermore operative to compute an overall level of comfort for each location based upon the collected information and further information concerning the need for conditioned air at the location relative to the need for conditioned air at the other locations wherein the further information concerning the need for conditioned air at the location relative to the need for conditioned air at other locations comprises stored adjustment factors for each location, each adjustment factor having been previously generated based upon the need for conditioned air at a respective location relative to the need for conditioned air at other locations, said at least one computer is communication with the plurality of data entry devices being operative to use the stored adjustment factor for the particular location when computing a level of comfort for the particular location, the stored adjustment factor having been previously generated based upon the need for conditioned air at the particular location relative to the need for conditioned air at the other locations; and at least one HVAC control being operative to control the provision of conditioned air to each of the locations in response to receipt of the computed overall levels of comfort for each location.

12. The system of claim 11 wherein the stored adjustment factors have been previously generated based upon the heat retention properties or by occupancy priority for the locations in which the particular groupings of entry devices are located.

13. The system of claim 12 wherein the adjustment factors are defined relative to numerical value of one with factors fractionally greater than one for locations requiring more conditioned air and factors being less than one for locations requiring less conditioned air.

14. The system of claim 11 wherein the adjustment factors are defined relative to a numerical value of one with factors fractionally greater than one for locations requiring more conditioned air and factors being less than one for locations requiring less conditioned air.

15. The system of claim 11 wherein said at least one computer in communication with the plurality of data entry devices is operative to determine an overall level of comfort for each particular location based upon the collected levels of comfort for the particular location and to thereafter apply the adjustment factor for the particular location to the previously determined overall level of comfort for the location.

16. The system of claim 15 wherein the stored adjustment factors have been previously generated based upon the heat retention properties or by occupancy priority for the locations in which the particular groupings of entry devices are located.

17. The system of claim 16 wherein the adjustment factors are defined relative to a numerical value of one with factors fractionally greater than one for locations requiring more conditioned air and factors being less than one for locations requiring less conditioned air.

18. The system of claim 11 wherein said data entry devices are operative to generate a menu of different comfort levels that may be selected at each data entry device, each said data entry device being operative to store at least one comfort level that has been selected for transmission to said at least one computer in communication with said data entry devices.

* * * * *